United States Patent
Lin (10) Patent No.: US 10,867,046 B2
(45) Date of Patent: Dec. 15, 2020

(54) METHODS AND APPARATUS FOR AUTHENTICATING A FIRMWARE SETTINGS INPUT FILE

(71) Applicant: QUANTA COMPUTER INC., Taoyuan (TW)

(72) Inventor: Yu-Han Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 224 days.

(21) Appl. No.: 16/058,376

(22) Filed: Aug. 8, 2018

(65) Prior Publication Data

US 2020/0050767 A1 Feb. 13, 2020

(51) Int. Cl.
  *G06F 21/57* (2013.01)
  *G06F 21/64* (2013.01)
  *H04L 9/30* (2006.01)
  *H04L 9/32* (2006.01)

(52) U.S. Cl.
  CPC ............ *G06F 21/572* (2013.01); *G06F 21/64* (2013.01); *H04L 9/30* (2013.01); *H04L 9/3236* (2013.01)

(58) Field of Classification Search
  CPC ......... G06F 21/572; G06F 21/64; H04L 9/30; H04L 9/3236
  USPC ....................................................... 713/189
  See application file for complete search history.

(56) References Cited

U.S. PATENT DOCUMENTS

| 5,799,086 A * | 8/1998 | Sudia ..................... H04L 9/085 |
| | | 705/76 |
| 5,859,911 A * | 1/1999 | Angelo ............... G06F 12/1408 |
| | | 711/E12.092 |
| 2006/0143600 A1* | 6/2006 | Cottrell ................. G06F 21/572 |
| | | 717/168 |
| 2008/0256363 A1 | 10/2008 | Balacheff et al. |

(Continued)

FOREIGN PATENT DOCUMENTS

| CN | 106960155 A | 7/2017 |
| EP | 2402879 A1 | 6/2011 |

(Continued)

OTHER PUBLICATIONS

JP Office Action for Application No. 2018-241556, dated Oct. 8, 2019, w/ First Office Action Summary.

(Continued)

*Primary Examiner* — Michael S McNally
(74) *Attorney, Agent, or Firm* — Nixon Peabody LLP (57) ABSTRACT

The present disclosure describes devices and methods that allow for authenticating a firmware settings input file. The devices and methods of the present disclosure provide for receiving a firmware settings input file and a code associated with the firmware settings input file. The firmware settings input file is configured for updating firmware settings within the computer system. The devices and methods further generate a first value based on the firmware settings input file, and decrypt the code with an encryption key to obtain a second value from the code. The devices and methods further compare the first value and the second value to authenticate the firmware settings input file based on whether the first value and second values satisfy one or more conditions. When the conditions are satisfied, the firmware within the computer system can be updated based on the firmware settings input file.

16 Claims, 3 Drawing Sheets

(56) References Cited

U.S. PATENT DOCUMENTS

| 2010/0023777 | A1* | 1/2010 | Prevost | G06F 21/572 |
| | | | | 713/180 |
| 2012/0011219 | A1* | 1/2012 | Zhang | H04W 12/0023 |
| | | | | 709/217 |
| 2012/0124567 | A1* | 5/2012 | Landry | G06F 8/654 |
| | | | | 717/168 |

FOREIGN PATENT DOCUMENTS

| JP | 2006-185063 A | 7/2006 |
| JP | 2008-234205 A | 10/2008 |
| JP | 2014-021923 A | 2/2014 |
| TW | I518595 B | 1/2016 |
| WO | 2015131607 A1 | 9/2015 |

OTHER PUBLICATIONS

TW Office Action for Application No. 107138888, dated Nov. 7, 2019, w/ First Office Action Summary.
Extended European Search Report for EP Application No. 18211443.9, dated Jul. 3, 2019.

\* cited by examiner

METHODS AND APPARATUS FOR AUTHENTICATING A FIRMWARE SETTINGS INPUT FILE

FIELD OF THE INVENTION

The present invention relates to updating firmware settings within a computer system, and more specifically, to authenticating a firmware settings update.

BACKGROUND

Firmware is used in various components in computer systems. Examples of firmware include basic input/output system (BIOS) firmware, baseboard management controller (BMC) firmware, peripheral component interconnect express (PCIe) firmware, and the like.

Methods and utilities exist that allow for updating firmware settings. One common method to update firmware settings is to use a configuration utility provided by the firmware vendor or source. The utility uses a firmware settings input file that can be provided by an entity that provides the firmware, e.g., the firmware provider. The file can describe the settings that should be changed and the corresponding values for the settings. The configuration utility receives the input file and communicates with memory storing the firmware. The configuration utility follows the changes in the input file to modify the desired settings of the firmware in the memory. Thereafter, the firmware operates according to the new settings.

Certain changes to the firmware may damage hardware or cause security problems. Moreover, although the firmware provider can create the firmware settings input file, so too can a malicious source or a user without the required knowledge to correctly modify the firmware settings. For example, a malicious source can create a firmware settings input file that configures the BIOS settings to a state that damages and/or lowers the security level of a computer system. As a result, the firmware may be corrupted by malicious or incorrect changes.

Accordingly, there is a need for devices and methods that prevent malicious or incorrect changes to firmware by authenticating a firmware settings input file prior to writing the settings from the firmware settings input file into memory.

SUMMARY

Methods and devices are disclosed that authenticate a firmware settings input file by use of a code and values associated with the file. The code and values allow for authentication of the file prior to writing settings from the file into memory. The code can be encrypted from the original firmware settings input file's hash value with an encryption key so that only the firmware provider, or other verified originator for the firmware settings input file, can create the valid code.

The code can be a unique value that is determined from the firmware settings input file. Upon receipt of the file and the code, the code can be decrypted to obtain the unique value, such as the unique hash value. Another value can be generated from the file, and whether the two values satisfy one or more conditions can be used to verify the authenticity of the firmware settings input file. The one or more conditions can include the two value, such as two hash values, matching.

A computer-implemented method for an authenticated firmware settings update within a computer system, according to a first embodiment, includes receiving a firmware settings input file and a code associated with the firmware settings input file. The firmware settings input file is configured for updating firmware settings within the computer system. The method further includes generating a first value based on the firmware settings input file. The value can be unique to the firmware settings input file based on the settings and corresponding values within the file. The method also includes decrypting the code with an encryption key to obtain a second value from the code. The method further includes comparing the first value and the second value to authenticate the firmware settings input file based on whether the first value matches the second value. The method further includes updating the firmware within the computer system based on the firmware settings input file when the first value and the second value match.

In some implementations, the first value and the second value are hash values generated based on a hash function or checksum values generated based on a checksum algorithm. In some implementations, the code can be a certificate that can be appended to the firmware settings input file. In some implementations, the method includes retrieving the encryption key from memory within the computer system. In some implementations, the memory can be the same memory that stores the firmware, and can also store an algorithm that is used to generate the first value. In some implementations, the encryption key can be a public key of an asymmetric cryptography key pair.

A computer system, according to a second embodiment, includes memory storing computer-executable instructions, and a processing unit in communication with the memory. The processing unit executing the computer-executable instructions causes the computer system to perform operations. The operations include receiving a firmware settings input file and a code associated with the firmware settings input file. The firmware settings input file is configured for updating firmware settings within the computer system. The operations also include generating a first value based on the firmware settings input file. The value can be unique to the firmware settings input file based on the settings and corresponding values within the file. The operations also include decrypting the code with an encryption key to obtain a second value from the code. The operations also include comparing the first value and the second value to authenticate the firmware settings input file based on whether the first value matches the second value. The operations also include updating the firmware within the computer system based on the firmware settings input file when the first value and the second value match.

In some implementations, the first value and the second value are hash values generated based on a hash function or checksum values generated based on a checksum algorithm. In some implementations, the code can be a certificate that can be appended to the firmware settings input file. In some implementations, another operation is retrieving the encryption key from the memory within the computer system. In some implementations, the memory stores the firmware and an algorithm used to generate the first value. In some implementations, the encryption key can be a public key of an asymmetric cryptography key pair.

A computer-implemented method for generating an authenticated firmware settings input file, according to a third embodiment, includes generating a code associated with a firmware settings input file. The firmware settings input file can be configured for updating firmware settings within a computer system. The method further includes encrypting the code with an encryption key to create an encrypted code. The method also includes appending the encrypted code to the firmware settings input file to generate the authenticated firmware settings input file.

In some implementations, the encryption key can be a private key of an asymmetric cryptography key pair. In some implementations, the method can include transmitting the authenticated update file to a computer system for updating firmware settings within the computer system, and providing a decryption key to the computer system. In some implementations, the decryption key can be a public key of an asymmetric cryptography key pair, and the encryption key used to encrypt the hash value can be the private key of the asymmetric cryptography key pair.

A computer system, according to a fourth embodiment, includes memory storing computer-executable instructions, and a processing unit in communication with the memory. The processing unit executing the computer-executable instructions causes the computer system to perform operations. The operations include generating a code associated with the firmware settings input file. The firmware settings input file can be configured for updating the firmware settings within a computer system. The operations also include encrypting the code with an encryption key to create an encrypted code. The operations also include appending the encrypted code to the firmware settings input file to generate the authenticated update file.

In some implementations, the encryption key can be a private key of an asymmetric cryptography key pair. In some implementations, an operation can include transmitting the authenticated update file to a computer system for updating firmware settings within the computer system, and providing a decryption key to the computer system. In some implementations, the decryption key can be a public key of an asymmetric cryptography key pair, and the encryption key used to encrypt the hash value can be the private key of the asymmetric cryptography key pair.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments and are, therefore, not to be considered as limitations on the scope of the various embodiments or claims.

DETAILED DESCRIPTION

The various embodiments are described with reference to the attached figures, where like reference numerals are used throughout the figures to designate similar or equivalent elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

With regards to the present disclosure, the terms "computing device," or "computing system," and "computer system" refer to any electronically-powered or battery-powered equipment that has hardware, software, and/or firmware components, where the software and/or firmware components can be configured for operating features on the device. With regards to the present disclosure, the term "operating environment" can refer to any operating system or environment that functions to allow software to run on a computer system.

The methods and devices of the present disclosure provide a process for authenticating a firmware settings input file that can be used to update firmware settings within a computer system. Authenticating the firmware settings input file prevents or inhibits malicious or improper changes to the firmware settings within the computer system. Authentication allows for the recipient of the firmware settings input file to determine that the firmware settings input file comes from a trusted source. Thus, the authentication alleviates concerns over updating the firmware settings.

The authentication involves processing the firmware settings input file to generate a unique value that allows for distinguishing the firmware settings input file from other files. For example, the unique value can be a hash value resulting from processing the firmware settings input file based on a hash function. Alternatively, the value can be, for example, a check sum value resulting from processing the firmware settings input file based on a checksum algorithm. Other values and processes for can be used to generate a unique value or other type of unique identification associated with the firmware settings input file.

The authentication further involves encrypting the value generated from the firmware settings input file. Encryption prevents unauthorized parties from determining the generated value. Various types of encryption can be used. In one or more embodiments, because the authentication involves two parties—i.e., the encrypting party generating the firmware settings input file and the decrypting party using the firmware settings input file to update firmware settings of a computer system—the encryption can be based on an asymmetric cryptography key pair encryption scheme. The encrypting entity can have the private key to encrypt the value, and the decrypting entity can have the public key to decrypt the value. The decrypting entity can receive the firmware settings input file along with the encrypted value. The decrypting party can generate a value based on the same method (e.g., hash function, checksum algorithm, etc.) used by the encrypting party. The decrypting party also decrypts the encrypted value. If the two values satisfy a condition, such as matching, the firmware settings input file is authenticated, and the decrypting party can use the firmware settings input file to update the firmware settings within the computer system. If the two values do not satisfy the condition, an error may have error occurred that can be further investigated; a malicious actor may be attempting to modify the firmware settings of the computer system; or some other issue may have occurred that should otherwise prevent the update to the firmware settings.

The process of the present disclosure provides for an improved way of updating firmware settings within a computer system by providing authenticated firmware settings input files. Thus, the process prevents malicious, incorrect, or otherwise improperly generated firmware settings input files from being used to update firmware settings. As a result, performance of the computer system will not be impacted or damaged based on an incorrect firmware settings input file, and the security of the computer system will not be lowered based on a malicious actor attempting to change the security settings through a firmware settings update.

Figure 1:
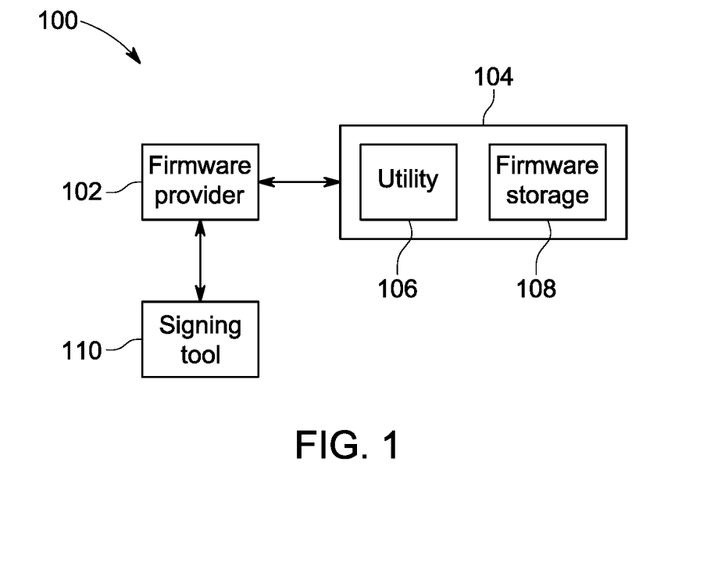
FIG. 1 illustrates a schematic diagram of a system for updating firmware settings, according to an embodiment of the present disclosure.

FIG. 1 shows a system 100 for updating firmware based on an authenticated firmware settings input file, according to an embodiment of the present disclosure. The system 100 includes a firmware provider 102 and a computer system 104. The firmware provider 102 is the originator of a firmware settings input file. The firmware settings input file is configured to update the firmware settings on the computer system 104. As will be described below, one or more processes on the computer system, such as a configuration utility 106, can process the firmware settings input file to update the firmware settings.

In one or more embodiments, the firmware provider 102 can be the creator of the firmware that is updated based on the firmware settings input file. Alternatively, in one or more embodiments, the firmware provider 102 may have authority to update the firmware settings based on the firmware settings input file, but otherwise is not the creator of the firmware. For example, the firmware provider 102 can be an administrator of the computer system 104 that has authority to modify the firmware settings on the computer system 104.

The firmware provider 102 can be embodied in a computer system that is separate from the computer system 104 but that can communicate with the computer system 104, as illustrated by the double arrow line. The firmware provider 102 can be local to, or remote from, the computer system 104. Communication between the firmware provider 102 and the computer system 104 can be via a direct connection or a remote connection, such as through a wide area network (WAN) (e.g., the Internet), a location area network (LAN), or the like.

The computer system 104 can be any type of computer system, such as a server computer system, a personal computer system, a mobile computing device, and the like. Alternatively, the computer system 104 can be a sub-component within a computer system that has its own firmware, such as a BMC within a server computer system.

The computer system 104 includes a configuration utility 106 and a firmware storage device 108. The firmware storage device 108 is the portion of the computer system 104 that stores the current firmware settings and that requires an update based on the firmware settings input file. In one or more embodiments, the utility 106 can be a process running within an operating environment of the computer system 104. Alternatively, in one or more embodiments, the utility 106 can be a process that can run independent of the operating environment on the computer system 104. For example, the utility 106 can run even when the computer system 104 is powered off because the utility 106 can be equipped with its own processor operating on standby power to read and/or write to the firmware storage device 108.

The utility 106 can be controlled locally, such as by a user at the computer system 104, or remotely, such as by a user at a computer system remote from the computer system 104 (e.g., at the firmware provider 102). In one or more embodiments, the utility 106 can write data to the firmware storage device 108; delete and write data on the firmware storage device 108; or read, write, and delete data on the firmware storage device 108. The utility 106 further is configured to write data to the firmware storage device 108 based on instructions within the firmware settings input file.

In one or more embodiments, the system 100 can further include a signing tool 110. The signing tool 110 can be operated by the firmware provider 102 or can alternatively be operated by a third party, such as a third-party signing service. As described further below, the signing tool 110 can be used in generating a code for the authenticated update file. The signing tool 110 can be any certification authority that issues a digital code that certifies the ownership of a firmware settings input file.

According to the arrangement shown in FIG. 1, firmware within the computer system 104 can be updated based on a firmware settings input file that is authenticated. Authentication can prevent or inhibit malicious and/or incidental changes to the firmware settings within the computer system 104 that may damage and/or reduce the security level within the computer system 104.

Figure 2:
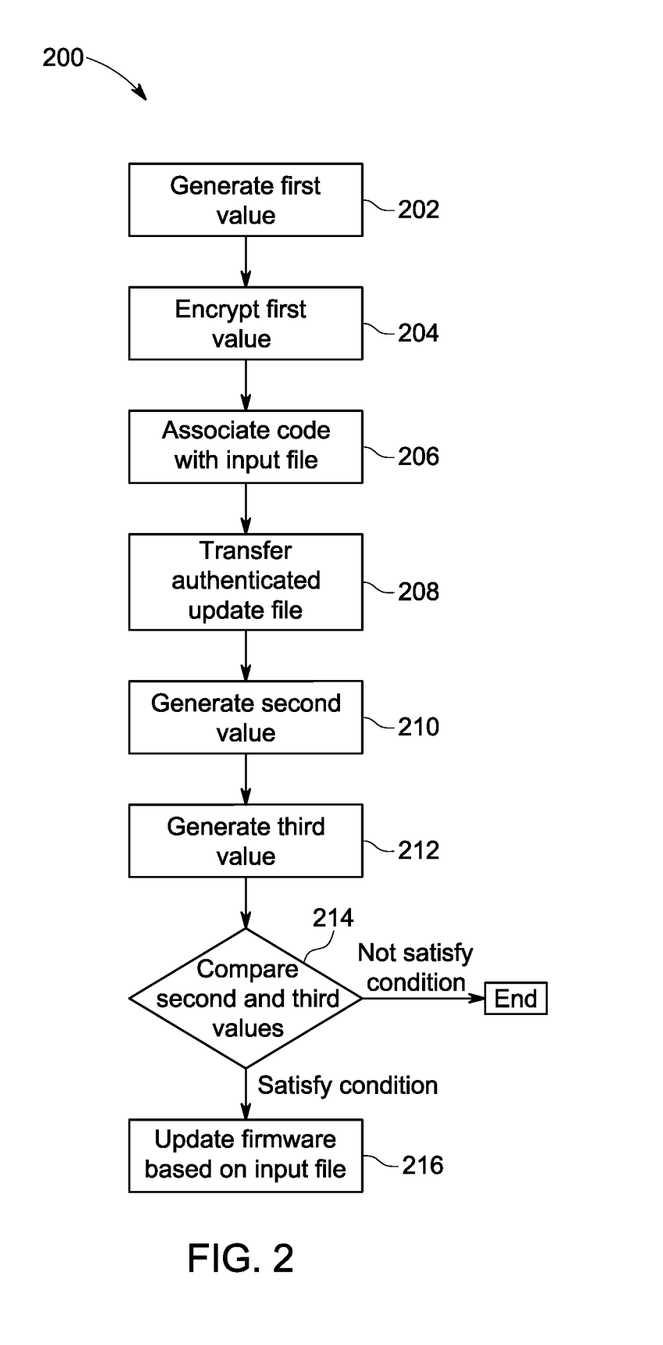
FIG. 2 illustrates a flowchart of the methodology for updating firmware, according to an embodiment of the present disclosure.

FIG. 2 illustrates a flowchart of a computer-implemented process 200 for updating firmware within a computer system, according to aspects of the present disclosure. The process 200 can be executed by one or more processes executed within one or more computer systems, such as the computer system 104 and a computer system embodying the firmware provider 102 of FIG. 1. In one or more embodiments, configuration utilities (e.g., configuration utility 106) running on the one or more computer systems can implement the process 200. All numbered system elements with respect to the description of FIG. 2 refer to the numbered elements in FIG. 1.

Prior to the process 200, a firmware settings input file is generated that is used to update the firmware settings on a computer system, such as the computer system 104. More specifically, the firmware settings input file is the input that describes which settings should be changed within the firmware, and the corresponding values for the settings. The firmware settings input file can be generated by the firmware provider 102.

The process 200 begins at step 202, where one or more algorithms process the firmware settings input file to generate a unique value associated with the firmware settings input file. The unique value allows for distinguishing the firmware settings input file from other firmware settings input files. The unique value also allows for determining whether there has been a change to the firmware settings input file. Specifically, if the firmware settings input file is changed, the processing of the firmware settings input file by the one or more algorithms will generate a different unique value, signifying or at least capturing the change.

There is no set format for the value, as long as the value allows for distinguishing the firmware settings input file and provides enough granularity for identifying a change to the settings, values, or both within the firmware settings input file. For example, the value can be a string or a multi-dimensional matrix of numbers, letters, or both.

The one or more algorithms can be any type of algorithm that can characterize the firmware settings input file as a unique value. For example, in one or more embodiments, the one or more algorithms can be one or more hash functions. The hash functions generate a hash value that is unique to the firmware settings input file based on the specific settings and values within the firmware settings input file. In one or more alternative embodiments, the one or more algorithms can be one or more checksum algorithms. The checksum algorithms generate a checksum value that is unique to the firmware settings input file based on the specific settings and values within the firmware settings input file.

Step 202 can be performed by, for example, the firmware provider 102 or the signing tool 110. For example, in one or more embodiments, the firmware provider 102 can generate the firmware settings input file and transfer the firmware settings input file to the signing tool 110 to generate the unique value.

At step 204, the unique value is encrypted. Any encryption scheme can be used to encrypt the unique value. In one embodiment, an asymmetric cryptography key pair encryption scheme can be used to encrypt the unique value. More specifically, a private key of an asymmetric cryptography key pair can be used to encrypt the unique value. The private key should be kept secret to ensure authenticity of the firmware settings input file. In one or more embodiments, the encrypted unique value can then be stored as, for example, a code. In one or more specific embodiments, the code can be, for example, a certificate.

Similar to step 202, step 204 can be performed by the firmware provider 102 or the signing tool 110. Moreover, step 204 can be performed by an entity different that the entity that performs step 202. For example, the firmware provider 102 can perform step 202, and the signing tool 110 can perform step 204.

At step 206, the code is then appended to the firmware settings input file. In one or more embodiments, a special character can be added at the end of the firmware settings input file so that the utility 106 can recognize where to append the code. Alternatively, or in addition, a file header format can be used to describe which portion of the authenticated update file is the firmware settings input file and which portion is the code. The combination of the code and the firmware settings input file results in an authenticated update file because the code can be used to authenticate the firmware settings input file, as described below. Similar to steps 202 and 204, step 206 can be performed by the firmware provider 102 or the signing tool 110.

At step 208, the authenticated update file is transmitted to, and is received by, the computer system that requires the firmware settings update. For example, the firmware provider 102 can transmit the authenticated update file to the computer system 104. In one or more specific embodiments, the authenticated update file can be received by a configuration tool running on the computer system, such as the utility 106 on the computer system 104.

At step 210, a second value is generated based on the firmware settings input file within the authenticated update file. The computer system that received the authenticated update file includes algorithms that create the second hash value. In one or more embodiments, these algorithms can be the same algorithms from step 202 that create the unique value. However, instead of, for example, the firmware provider 102 generating the unique value, the computer system 104 generates the unique value. Alternatively, the one or more algorithms can be different algorithms to generate a value that satisfies one or more conditions, as described further below. The computer system 104 can store the one or more algorithms in memory. In one or more embodiments, the computer system 104 can store the one or more algorithms, such as the one or more hash functions or the one or more checksum algorithms, in the same memory that stores the firmware. For example, the firmware storage device 108 can store the one or more hash functions.

At step 212, the code that is appended to the firmware settings input file is decrypted to obtain a third value. The third value should be the same value as the first value. Thus, in essence, step 212 can be recovering the first value from the code. However, if there was an error, an intervening malicious third party, or some other type of issue, the third value may not be the same as the first value, as further descried below.

The code is decrypted using the same encryption scheme as the scheme used in step 204. In one or more embodiments, the decryption key can be stored within memory of the computer system. For example, the firmware storage device 108 can store the decryption key. However, the decryption key can be stored anywhere within the computer system. When an asymmetric cryptography key pair encryption scheme is used in step 204 to encrypt the first value, a public key from the asymmetric cryptography key pair can be used to generate the third value. The public key can be saved within the firmware storage device 108.

At step 214, it is determined whether the second value, obtained from processing the firmware settings input file with the one or more algorithms, and the third value, obtained from decrypting the code, satisfy one or more conditions. Satisfaction of the conditions indicates that the firmware settings update file is authenticate and that updating of the firmware can proceed.

In one or more embodiments, the one or more conditions constitute the second value matching the third value. The second value matching the third value verifies that the authenticated update file originated from the firmware provider 102. Thus, although the values described above are referred to as first, second, and third values, if the firmware settings input file is authenticated according to the above scheme, the first, second, and third values are the same value. Accordingly, the terms first, second, and third are for description purposes only and are not meant to be limiting.

In one or more alternative embodiments, the one or more conditions constitute the second and third values in combination satisfying a condition, although not matching. For example, the second and third values can sum to a predetermined value. Alternatively, the second and third values can together form a key or password. The key or password may be required to satisfy a condition within the configuration utility.

In one or more alternative embodiments, human body signature information can be added to the first value. The human body signature information can be verified prior to decrypting and generating the third value.

At step 216, if the one or more conditions are satisfied, the computer system updates the firmware based on the settings within the firmware settings input file. In one or more embodiments, the configuration utility modifies the firmware based on the firmware settings input file. If the one or more conditions are not satisfied, the computer system does not update the firmware based on the firmware settings input file. This latter situation may occur if, for example, a malicious actor or other entity modified the firmware settings input file prior to receipt by the computer system; or the malicious actor or other entity may have even created the firmware settings input file. In one or more embodiments, in addition to not updating the firmware one or more other conditions can occur. For example, the event of not updating the firmware can be logged in the computing system to warn a user (e.g., administrator) about the suspicious activity. In the alternative, or in addition, if the fail condition happens multiple times within a set period of time, any future firmware setting change request can be rejected for a set duration, or even indefinitely until canceled by a user, to prevent any additional malicious activity relative to updating the firmware settings.

Although the process 200 is described above and illustrated in FIG. 2 as occurring in the specific steps, one or more of the steps can be removed, or the order of one or more of the steps can be changed. For example, the process 200 concerns both the generating of the authenticated update file and the update of the firmware settings. In one or more embodiments, a process may occur that concerns only authenticating a firmware settings input file. For example, the process 200 may begin at step 208 after receipt of the authenticated update file at the computer system. Alternatively, a process may occur that concerns only generating the firmware settings input file. For example, the process 200 may begin at step 202 but may end at step 208 and the transmission of the authenticated update file. Thus, aspects of the present disclosure should not be limited to requiring each and every step described and illustrated with respect to FIG. 2.

The flow diagram in FIG. 2 is representative of example machine-executable instructions that can be executed by a computer system or a sub-component of a computer system. In this example, the machine-executable instructions comprise an algorithm for execution by: (a) a processor; (b) a controller; and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Further, although the example algorithm is described with reference to the flowchart illustrated in FIG. 2, persons of ordinary skill in the art will readily appreciate that many other methods of implementing the example machine-executable instructions may alternatively be used.

Figure 3:
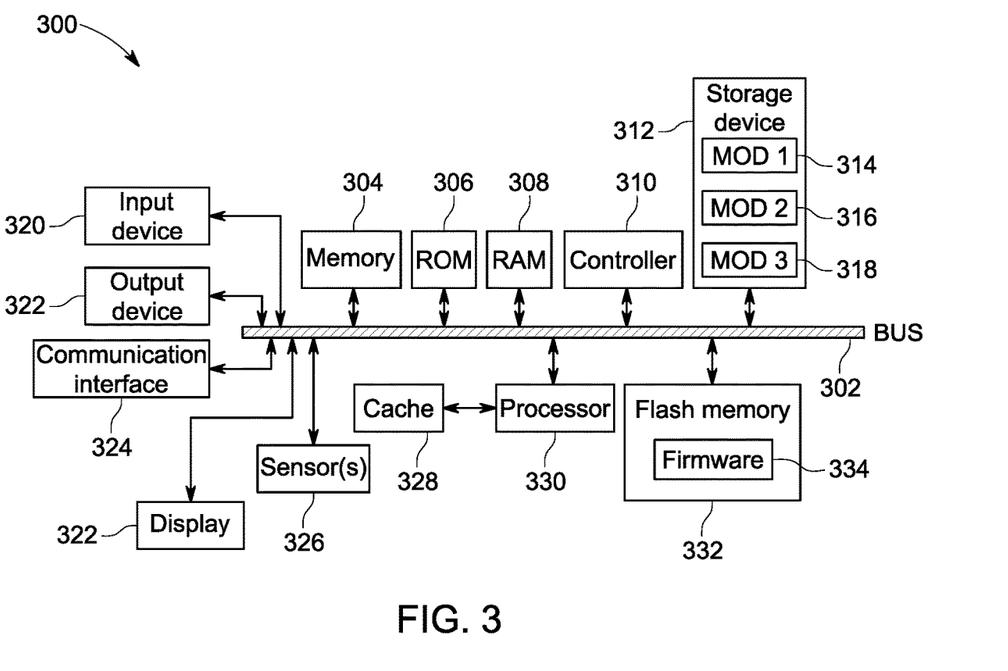
FIG. 3 illustrates a schematic diagram of a computer system that can be used to perform various aspects of the present disclosure.

FIG. 3 illustrates an example computer system 300, in which components of the computer system 300 are in electrical communication with each other using a bus 302. The system 300 includes a processing unit (CPU or processor) 330 and a system bus 302 that couples various system components, including the system memory 304 (e.g., read only memory (ROM) 306 and random access memory (RAM) 308), to the processor 330. The system 300 can include a cache of high-speed memory connected directly with, in close proximity to, or integrated as part of the processor 330. The system 300 can copy data from the memory 304 and/or the storage device 312 to the cache 328 for quick access by the processor 330. In this way, the cache 328 can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may be a completely self-contained computer system, and contain multiple cores or processors, a bus, memory controller, cache, etc. A multi-core processor may be symmetric or asymmetric.

In one or more embodiments, to enable user interaction with the system 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 is also provided. The communications interface 324 can govern and manage the user input and system output.

Storage device 312 can be a non-volatile memory to store data that is accessible by a computer. The storage device 312 can be magnetic cassettes, flash memory cards, solid state memory devices, digital versatile disks, cartridges, RAM 308, ROM 306, and hybrids thereof.

The controller 310 can be a specialized microcontroller or processor on the system 300, such as a BMC. In some cases, the controller 310 can be part of an Intelligent Platform Management Interface (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, non-volatile random-access memory (NVRAM), or CMOS (complementary metal-oxide semiconductor), for example. The flash memory 332 can store the firmware 334 executed by the system 300, when the system 300 is first powered on, along with a set of configurations specified for the firmware 334. The flash memory 332 can also store a configuration utility used by the firmware 334.

The firmware 334 can include a Basic Input/Output System or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test) on the system 300. This self-test can test the functionality of various hardware components, such as hard disk drives, optical reading devices, cooling devices, memory modules, expansion cards, and the like. The firmware 334 can address and allocate an area in the memory 304, ROM 306, RAM 308, and/or storage device 312 to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set monitoring of health (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth.

Figure 4:
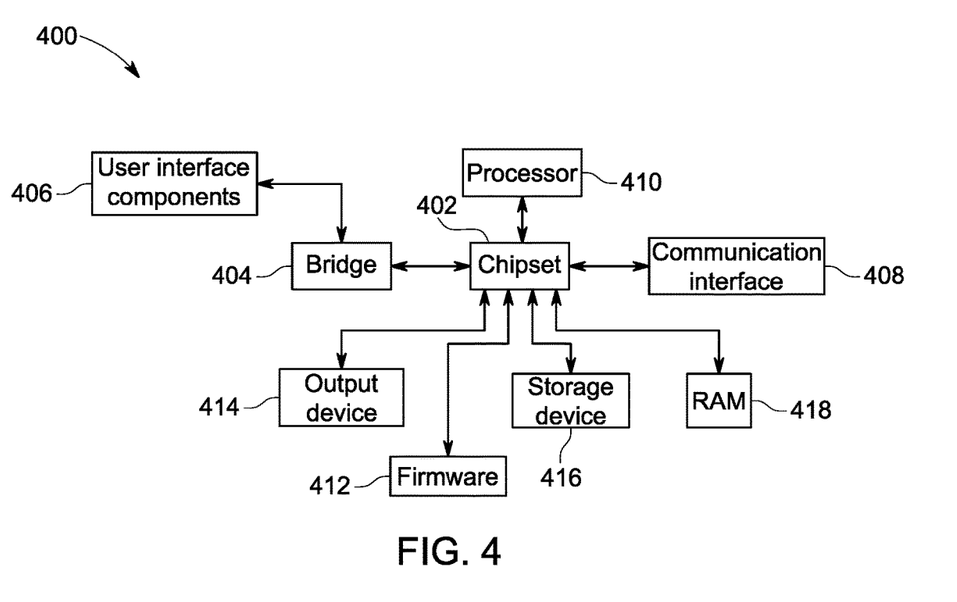
FIG. 4 illustrates another schematic diagram of a computer system that can be used to perform various aspects of the present disclosure.

FIG. 4 illustrates another example computer system 400 having a chipset architecture that can be used in executing the described method(s) or operation(s) of the present disclosure. Computer system 400 can include computer hardware, software, and firmware that can be used to implement the disclosed technology. System 400 can include a processor 410, representative of a variety of physically and/or logically distinct resources capable of executing software, firmware, and hardware configured to perform identified computations. Processor 410 can communicate with a chipset 402 that can control input to, and output from, processor 410. In this example, chipset 402 outputs information to output device 414, such as a display, and can read and write information to storage device 416, which can include magnetic media, and solid state media, for example. Chipset 402 can also read data from, and write data to, RAM 418. A bridge 404 for interfacing with a variety of user interface components 406, can be provided for interfacing with chipset 402. Such user interface components 406 can include a keyboard, a microphone, touch detection and processing circuitry, a pointing device, such as a mouse, and so on. In general, inputs to system 400 can come from any of a variety of sources, machine generated and/or human generated.

Chipset 402 can also interface with one or more communication interfaces 408 that can have different physical interfaces. Such communication interfaces can include interfaces for wired and wireless local area networks, broadband wireless networks, and personal area networks. Further, the machine can receive inputs from a user via user interface components 406 and execute appropriate functions.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-410 and 414-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 and 400 can have more than one processor (e.g., 330, 410), or be part of a group or cluster of computing devices networked together to provide greater processing capability.

For clarity of explanation, in some instances, the present disclosure may be presented as including functional blocks, such as devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers, or computing devices that can be used to operate any of a number of applications. User or client devices can include any number of general purpose personal computers, such as desktop or laptop computers running a standard operating system; as well as cellular, wireless, and handheld devices running mobile software, and capable of supporting a number of networking and messaging protocols. Such a system can also include a number of workstations running any variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discreet logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method for an authenticated firmware settings update within a computer system, the method comprising:

receiving a firmware settings input file and a code associated with the firmware settings input file, the firmware settings input file being configured for updating firmware settings within the computer system;

generating a first value based on the firmware settings input file;

decrypting the code with an encryption key to obtain a second value;

combining the first value and the second value together to form a key;

authenticating the firmware settings input file based on whether the key satisfies a condition; and updating the firmware settings within the computer system based on the firmware settings input file when the key satisfies the condition.

2. The method of claim 1, wherein the first value and the second value are hash values generated based on a hash function or checksum values generated based on a checksum algorithm.

3. The method of claim 1, wherein the code is a certificate that is appended to the firmware settings input file.

4. The method of claim 1, further comprising retrieving the encryption key from memory within the computer system.

5. The method of claim 4, wherein the memory stores the firmware and an algorithm used to generate the first value.

6. The method of claim 1, wherein the encryption key is a public key of an asymmetric cryptography key pair.

7. A computer system comprising:

memory storing computer-executable instructions; and a processing unit in communication with the memory, wherein the processing unit executing the computer-executable instructions causes the computer system to perform operations comprising:
  receiving a firmware settings input file and a code associated with the firmware settings input file, the firmware settings input file being configured for updating firmware settings within the computer system;
  generating a first value based on the firmware settings input file;
  decrypting the code with an encryption key to obtain a second value from the code;
  combining the first value and the second value together to form a key;
  authenticating the firmware settings input file based on whether the key satisfies a condition; and
  updating the firmware settings within the computer system based on the firmware settings input file when the first value and the second value match.

8. The computer system of claim 7, wherein the first value and the second value are hash values generated based on a hash function or checksum values generated based on a checksum algorithm.

9. The computer system of claim 7, wherein the code is a certificate that is appended to the firmware settings input file.

10. The computer system of claim 7, wherein the processing unit executing the computer-executable instructions causes the computer system to perform operations comprising:
  retrieving the encryption key from the memory within the computer system.

11. The computer system of claim 10, wherein the memory stores the firmware and an algorithm used to generate the first value.

12. The computer system of claim 7, wherein the encryption key is a public key of an asymmetric cryptography key pair.

13. A computer-implemented method for generating an authenticated firmware settings input file, the method comprising:
  generating a code associated with a firmware settings input file, the firmware settings input file being configured for updating firmware settings within a computer system;
  encrypting the code with an encryption key to create an encrypted code;
  appending the encrypted code to the firmware settings input file to generate the authenticated firmware settings input file; and
  marking the firmware settings input file with a special character to identify the encrypted code.

14. The method of claim 13, wherein the encryption key is a private key of an asymmetric cryptography key pair.

15. The method of claim 13, further comprising:
  transmitting the authenticated update file to a computer system for updating firmware settings within the computer system; and
  providing a decryption key to the computer system.

16. The method of claim 15, wherein the decryption key is a public key of an asymmetric cryptography key pair, and the encryption key used to encrypt the hash value is the private key of the asymmetric cryptography key pair.

* * * * *